United States Patent [19]

Riola'

[11] Patent Number: 5,675,226

[45] Date of Patent: Oct. 7, 1997

[54] CONTROL CIRCUIT FOR AN SYNCHRONOUS ELECTRIC MOTOR OF THE BRUSHLESS TYPE

[75] Inventor: Pasqualino Riola', Asti, Italy

[73] Assignee: C.E.SET. S.r.l., Castell'alfero, Italy

[21] Appl. No.: 524,073

[22] Filed: Sep. 6, 1995

[51] Int. Cl.[6] .................................................. H02P 6/00
[52] U.S. Cl. ........................ 318/439; 318/254; 318/721
[58] Field of Search .................................... 318/138, 254, 318/439, 700, 720, 721, 722, 724

[56] References Cited

U.S. PATENT DOCUMENTS

| | | | |
|---|---|---|---|
| 4,060,753 | 11/1977 | Okuyama et al. | 318/254 X |
| 4,125,796 | 11/1978 | Nagase et al. | 318/254 X |
| 4,600,864 | 7/1986 | Sato | 318/254 |
| 4,769,581 | 9/1988 | Rilly | 318/254 |
| 4,780,652 | 10/1988 | Rilly | 318/254 |
| 5,386,185 | 1/1995 | Beck et al. | 318/762 |

*Primary Examiner*—Bentsu Ro
*Attorney, Agent, or Firm*—Sughrue, Mion, Zinn, Macpeak, and Seas

[57] ABSTRACT

A control circuit comprises a TRIAC (T) in series with the stator winding (1) of the motor across the terminals of an alternating voltage source ($V_M$). A fixed sensor (H) is associated with the rotor (R) and operable to provide a signal indicative of the magnetic polarity of the part of the rotor (R) facing it. A diode circuit (DC) including at least one Zener diode supplies the sensor (H) and provides a signal indicative of the polarity of the alternating supply voltage ($V_M$). A driver circuit (PC) is connected to the sensor (H) and to the diode circuit (DC) and pilots the control input (g) of the TRIAC (T) in a predetermined manner in dependence on the instantaneous position of the rotor (R) and the polarity of the supply voltage ($V_M$).

16 Claims, 9 Drawing Sheets

CONTROL CIRCUIT FOR AN SYNCHRONOUS ELECTRIC MOTOR OF THE BRUSHLESS TYPE

BACKGROUND OF THE INVENTION

The present invention relates to an electric circuit for a synchronous electric motor of the brushless type including a permanent magnet rotor rotatable between stator pole pieces shaped in such a way as to define, with respect to the rotor, a non-uniform air gap so that the rotor, at rest, is disposed in a predetermined angular position and, upon starting, has a preferential direction of rotation.

SUMMARY OF THE INVENTION

A first object of the invention is to provide a circuit operable to control the supply of current to the stator winding of such an electric motor both in the start-up phase, in which the motor is driven in an asynchronous manner, and subsequently in normal running operation, in which the motor exhibits a properly synchronous behaviour, that is to say it runs at a speed rigidly related to the frequency of the alternating voltage supply, typically the mains voltage.

This object is achieved according to the invention by means of a control circuit characterised in that it comprises, in combination:

a bi-directional static switch in series with the stator winding of the motor, between the terminals of an alternating voltage source;

signal generator circuit means operable to provide a signal indicative of the polarity of the said alternating voltage;

a fixed electric sensor associated with the rotor to provide an electrical signal indicative of the polarity of that portion of the rotor facing it; and a piloting circuit connected to the sensor and to the signal generator circuit means and arranged to provide a control signal for controlling the conduction at a control terminal of the bi-directional switch in a predetermined manner in dependence on the position of the rotor and the polarity of the supply voltage.

Brushless synchronous electric motors of the above-defined type are used in particular in electrical domestic appliances, for example for driving the pumps of washing machines. For such applications it is convenient for the control circuit associated with the motor to be physically mounted in the motor casing itself or the casing of the pump with which the motor is associated. For this purpose it is, however, necessary that the control circuit should be of small dimensions and weight, and have a minimum heat dissipation. It is moreover necessary that the control circuit be optimised for the purpose of reducing the number of components thereof, and therefore the weight and also the cost.

These objectives are achieved according to the invention by means of a control circuit of the above-specified type which, according to a further aspect of the invention, is characterised in that the supply means and the signal generator circuit means are constituted by a single diode circuit coupled to the alternating voltage source, including at least one Zener diode and operable to provide a voltage having a non-zero mean value for supply of the sensor and a voltage signal in phase with the voltage of the source and indicative of its polarity.

BRIEF DESCRIPTION OF THE INVENTION

Further characteristics and advantages of the invention will become apparent from the following detailed description given purely by way of non-limitative example with reference to the attached drawings, in which.

DETAILED DESCRIPTION OF THE INVENTION

Figure 1:
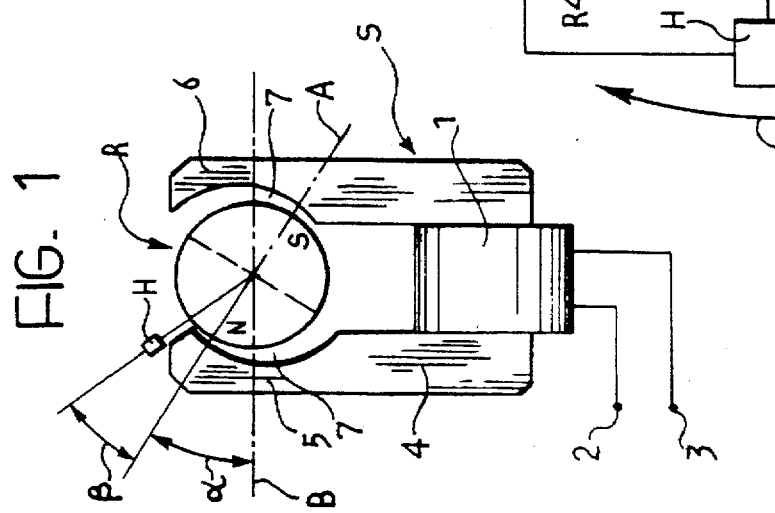
FIG. 1 is a schematic illustration of a brushless synchronous electric motor having a two-pole stator and a permanent magnet rotor.

In FIG. 1 there is schematically illustrated a synchronous electric motor of brushless type including a stator S and a rotor R. In the exemplary embodiment illustrated the stator comprises a winding 1 with two terminals indicated 2 and 3 wound on a stack of substantially U-shape laminations 4. The ends of this stack of laminations form two pole pieces 5 and 6 between which the rotor R is rotatably mounted. The pole pieces 5 and 6 are shaped in such a way as to define, with respect to the rotor R, air gaps of non-uniform width. In the exemplary embodiment illustrated in FIG. 1 the air gaps 7 have, proceeding in a clockwise sense around the axis of the rotor R, a progressively decreasing width. The consequence of this is that, at rest, the rotor R is disposed in a predetermined angular position in which the axis A of its north and south poles N and S, forms an angle α with respect to the axis B of the pole pieces 5 and 6.

By virtue of the non-uniformity of the width of the air gaps the rotor R, upon start-up, has a preferential direction of rotation. Thus, by making an alternating current flow in the winding 1, if the first half-wave (for example the positive one) causes the appearance of a north pole at the pole piece 5, the rotor R starts to turn in a clockwise sense as seen in FIG. 1.

The rotor R is associated with a position sensor H, for example a Hall effect sensor, disposed in a fixed position, for example at an angle β with respect to the rest position of the axis A. This sensor provides, in operation, a signal indicative of the polarity of the portion of the rotor R which is facing it at any instant.

In order to drive the rotation during the start-up phase at the commencement of rotation, and then subsequently during the normal running of the motor, there is utilised, according to the invention, for example, the control circuit which will now be described with reference to FIG. 2.

Figure 2:
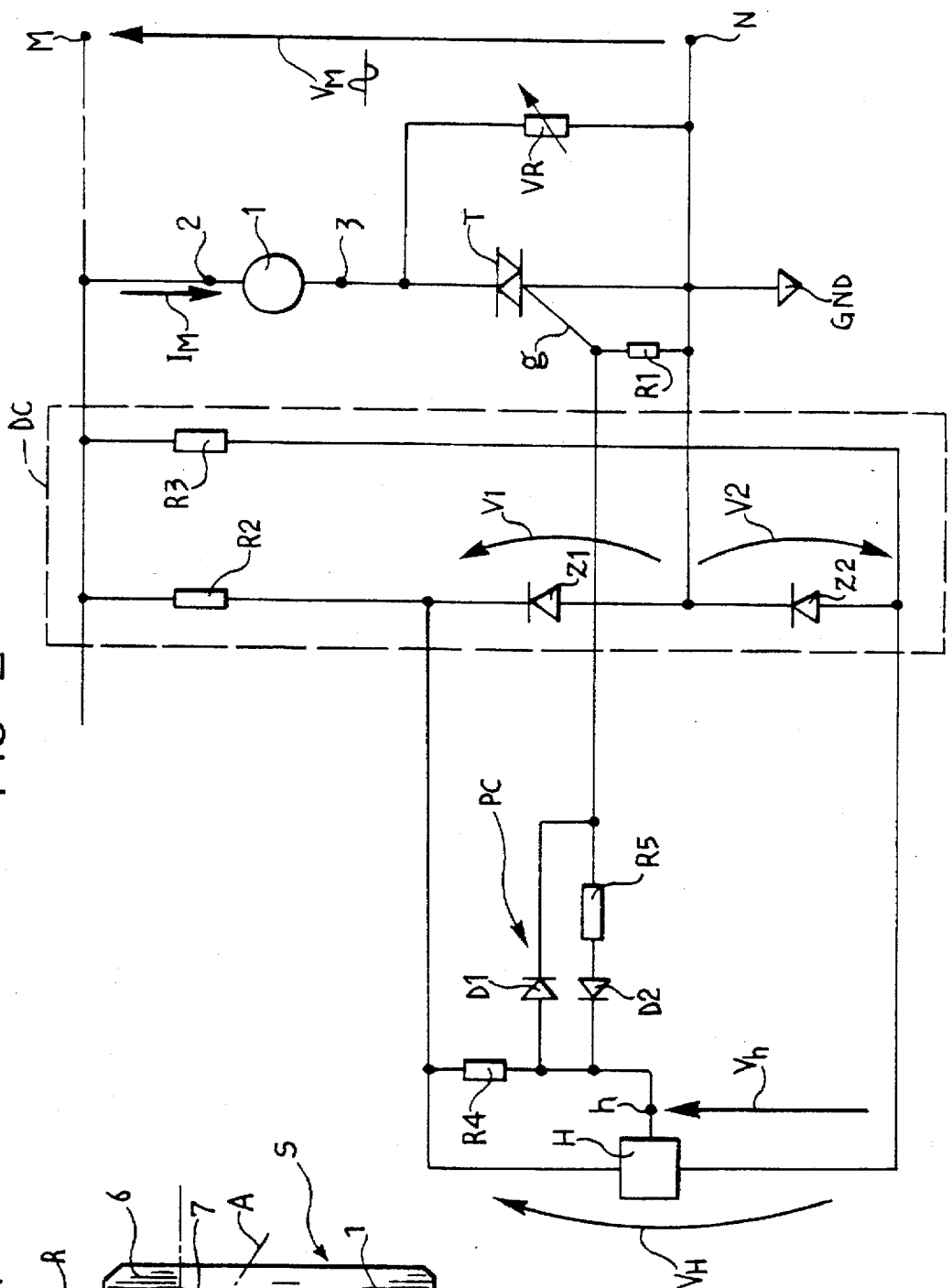
FIG. 2 is a circuit diagram of a first manner in which a control circuit according to the invention can be formed.

In FIG. 2 the stator winding 1 of the motor and its terminals have again been indicated with the reference numerals 1 to 3. This winding is disposed in series with a bi-directional static switch T across the terminals M and N of an alternating voltage supply source such as, for example, the electric mains. The alternating voltage applied between these terminals is indicated $V_M$.

The switch T is, for example, a TRIAC, preferably of sensitive type. In parallel with this TRIAC is connected a protection varistor VR.

The terminal N is further connected to ground GND.

Between the gate g of the TRIAC T and ground is interposed a biasing resistor R1.

The reference letters DC indicate a diode circuit which in the embodiment of FIG. 2 comprise two Zener diodes Z1 and Z2 having their cathodes and anodes respectively connected to the terminal M via respective resistors R2 and R3. The anode of Z1 and the cathode of Z2 are connected to ground GND.

Figure 3:
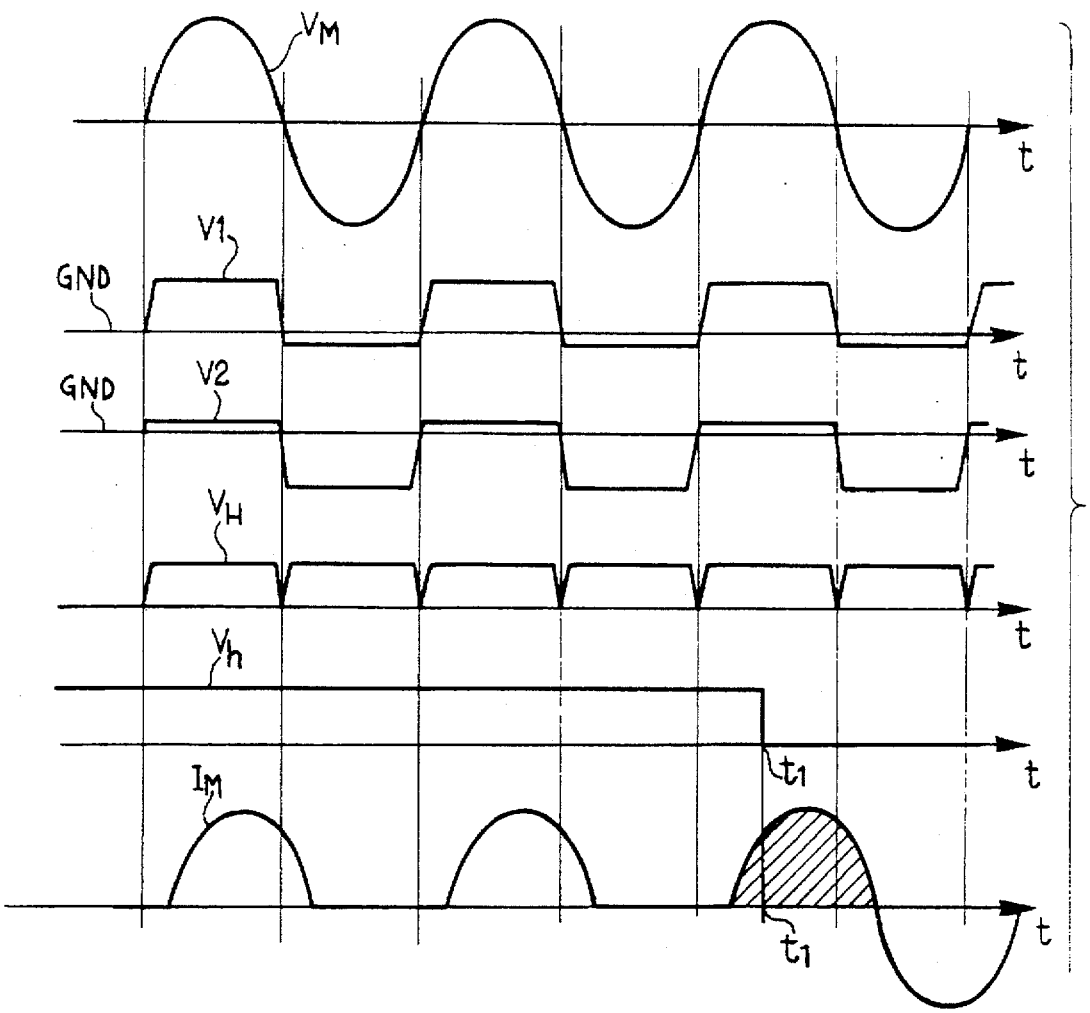
FIG. 3 is a series of graphs which show, as a function of time t plotted along the abscissa, the variation of some of the signals developed in operation of the circuit of FIG. 2.

The voltages which in operation develop across the terminals of the diodes Z1 and Z2 in FIGS. 2 and 3 have been indicated V1 and V2.

A sensor H has its supply terminals connected to the cathode of Z1 and the anode of Z2 respectively.

As shown by the graphs of FIG. 3, in operation at each positive half-wave of the alternating voltage $V_M$ the Zener diode Z1 is reverse biased, whilst the Zener diode Z2 is forward biased. Consequently, at each positive half-wave of the voltage $V_M$ the voltage V1 on Z1 is equal to the Zener voltage (for example 12V) whilst the voltage V2 on Z2 is equal to the voltage drop across the forward biased Zener diode Z2 (of the order of about 1V or less).

At each negative half-wave of $V_M$ the diode Z1 is forward biased whilst the diode Z2 is reversed biased.

Consequently, the variation in the voltages V1 and V2 is substantially as shown in FIG. 3: each of these voltages is a single frequency in phase with the mains voltage $V_M$ and, moreover, the amplitude or level of each of these voltages is indicative of the polarity of $V_M$.

The voltage between the supply terminals of the sensor H indicated $V_H$ in FIG. 2 (which is not referred to ground GND but rather to the potential of the anode of Z2) corresponds to the difference between V1 and V2 and therefore assumes the variation shown in FIG. 3. As is apparent from this Figure the voltage $V_H$ applied across the supply terminals of the sensor H is a voltage having a non-zero mean value.

The output of the sensor H is indicated h and the voltage between this output and the anode of the Zener diode Z2 is indicated $V_h$. The signal $V_h$ is a signal of logic type which assumes, for example, a "high" level when the sensor is faced by a north pole of the rotor R and a "low" level when a south pole faces the sensor.

The gate g of the TRIAC T is connected to a driver circuit generally indicated PC.

In the embodiment illustrated in FIG. 2 the driver circuit PC comprises a pair of diodes D1, D2 connected in antiparallel between the output h of the sensor H and the gate g of the TRIAC T. A resistor R4 is connected between the anode of D1 and the cathode of Z1. A resistor R5 is connected in series with the diode D2.

The current flowing in operation of the motor has been indicated $I_M$ in FIGS. 2 and 3. This current is typically phase delayed with respect to the alternating supply voltage $V_M$ since the impedance of the motor is an inductive reactance. The current which flows in the motor is substantially identical to the current which flows in the TRIAC T so that hereinafter this current will be equally well defined as the current flowing in the motor or the current flowing in the TRIAC.

The control circuit described above with reference to FIG. 2 functions as follows.

Upon start-up, that is to say when the alternating voltage $V_M$ is applied between the terminals M and N, a well defined polarity of rotor R (for example the north pole as shown in FIG. 1) faces the sensor H. Consequently at the output h of the sensor H a signal $V_h$ is present at the logic level which corresponds to this polarity, for example at the "high" level as shown in FIG. 3.

If the first half-wave of the alternating voltage $V_M$ is positive, as in the graph of FIG. 3, during this halfwave current arrives at the gate g of the TRIAC T through the resistors R2, R4 and the diode D1. Therefore the TRIAC T in this first half-wave is conductive and a current $I_M$ flows in the motor and in the TRIAC which is phase delayed with respect to the half-wave of the voltage $V_M$, as shown in FIG. 3. In these conditions the TRIAC is driven in the first quadrant (current entering in the gate, positive voltage on the TRIAC). The flow of current through the motor causes the application of a drive torque impulse to the rotor R which starts to turn, accelerating in a manner depending on the mechanical load associated with it and on its inertia.

During the course of the first negative half-wave of $V_M$ the current $I_M$ passes through zero and the current through the TRIAC is interrupted. In effect, if, as in the situation illustrated in the graphs of FIG. 3, during this first negative half-wave the sensor H again sees the same polarity of the rotor R which it has previously seen, the output h of the sensor remains still at the "high" level and both the diodes D1 and D2 are in fact turned off so that the gate g of the TRIAC T has no command signal applied thereto to trigger conduction.

The operation continues substantially as described above, the rotor R having a torque pulse applied thereto at each half-wave of the current $I_M$, and this continuing until the polarity of the rotor R which is first present at the sensor H changes. Upon the occurrence of this situation, indicated by the instant $t_1$ in FIG. 3, the output voltage $V_h$ of the sensor H passes to the "low" level. In the graphs of FIG. 3 it is supposed that the instant $t_1$ occurs during a positive half-wave after the current $I_M$ has started to flow in the TRIAC and in the motor. The change of $V_h$ to the "low" level does not interrupt the flow of current through the TRIAC and the motor. Rather, upon the arrival of the subsequent negative half-wave of $V_M$, the output h of H (at low level) causes reverse of D1 and forward biasing of D2. Consequently a current can flow from the gate g of T, passing through R5, D2, the sensor H and the resistor R3. In this situation the TRIAC T is driven in the third quadrant (output current, negative voltage) and the current $I_M$ after the instant $t_1$ continues as shown in FIG. 3. In the graph of $I_M$ shown in FIG. 3 the hatched area corresponds to the time period in which the torque applied to the rotor R by the effect of the current flowing in the winding 1 is not driving, but rather resisting, that is to say in opposition to the direction or rotation of the rotor R.

After the instant $t_1$ the TRIAC T continues to be driven periodically in the third quadrant as long as the output of the sensor H remains at low level. At each negative half-wave of the current a drive torque impulse is applied to the rotor which continues to accelerate.

The operation continues essentially in the manner described until following progressive acceleration of the rotor R it reaches synchronism, that is to say until the output of the sensor H has the same frequency and is in phase with the current flowing in the motor.

Once synchronism is reached the speed of rotation of the rotor R stabilises at a value strictly related to the frequency of the voltage $V_M$ of the supply, as well as to the number of poles of the motor. In the case of a synchronous motor having two stator poles and two rotor poles supplied with mains voltage at a frequency of 50 Hz the speed of synchronism corresponds to 3000 revolutions per minute.

As may be appreciated from the preceding description, the driver circuit PC provides a control signal to the gate g of the TRIAC T, which depends on the level of the output of the sensor H and therefore of the angular position of the rotor R, as well as the polarity of the supply voltage $V_M$. In the driver circuit according to FIG. 2 the diode circuit DC performs at the same time the functions of generating the necessary supply voltage to the sensor H and providing the driver circuit PC with information about the polarity of the supply voltage $V_M$. This functional synergism makes it possible advantageously to reduce the number of components and, therefore, the weight of the entire control circuit.

The Hall effect sensors currently available typically have an output of "open collector" type. The driver circuit PC shown in FIG. 2 takes account of this.

In the circuit according to FIG. 2 the currents flowing in the resistors R2 and R3 are in general different from one another, the current flowing in R3 being in particular about twice that flowing in R2.

Figure 4:
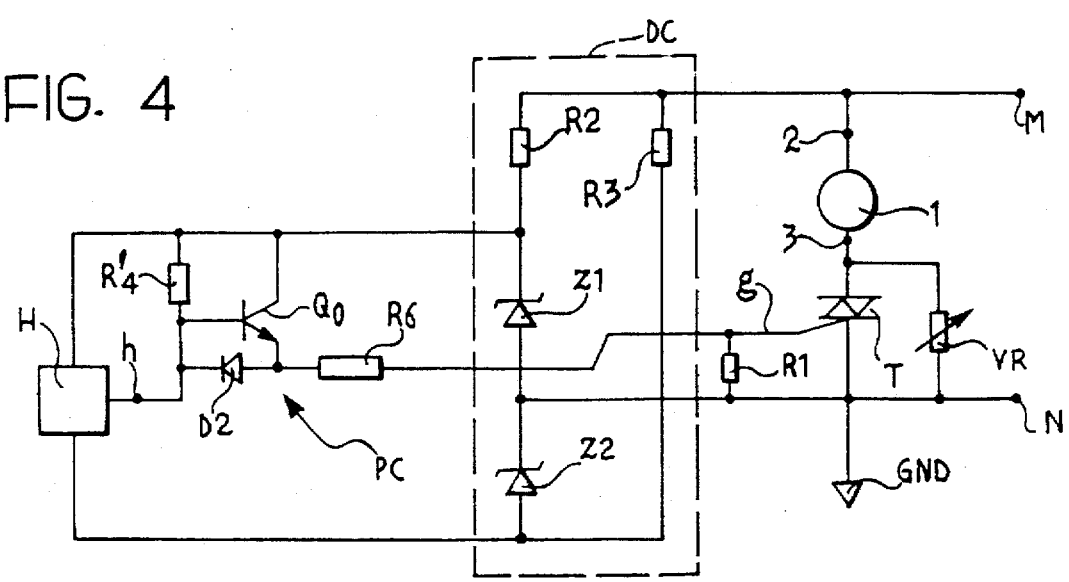
FIG. 4 is a circuit which shows a variant of the circuit shown in FIG. 2.

If it is wished to reduce the dissipation in the resistors R2 and R3 by arranging that the current flowing in operation in R3 becomes substantially equal to that flowing in R2, one can adopt a driver circuit PC having the structure shown in FIG. 4. In this Figure the parts and components already described have again been given the same reference numerals. The driver circuit PC of FIG. 4 comprises a transistor Q0 of npn type the base of which is connected to the output h of the sensor H, the emitter of which is connected to the gate g of the TRIAC T through a resistor R6 and the collector of which is connected to the cathode of Z1. A diode D2 has its anode and cathode respectively connected to the emitter and to the base of Q0, this diode being connected in anti-parallel to the base-emitter junction of Q0.

Between the base and the collector of Q0 is connected a resistor $R'_4$ which conveniently has a resistance rather greater than that of the resistor R4 of FIG. 2. In particular the resistance of $R'_4$ is about $\beta$ times the resistance of R4, $\beta$ being the gain of Q0.

The operation of the driver circuit PC of FIG. 4 is substantially similar to that of the corresponding circuit shown in FIG. 2: the function of the diode D1 of FIG. 2 is in fact performed by the base-emitter junction of transistor Q0. However, the resistance of $R'_4$ being rather higher than that of R4, there is a reduction in the current consumption and the currents which flow in the resistors R2 and R3 in operation can potentially equalise with an overall reduction in the current consumption in the control circuit associated with the motor.

Figure 5:
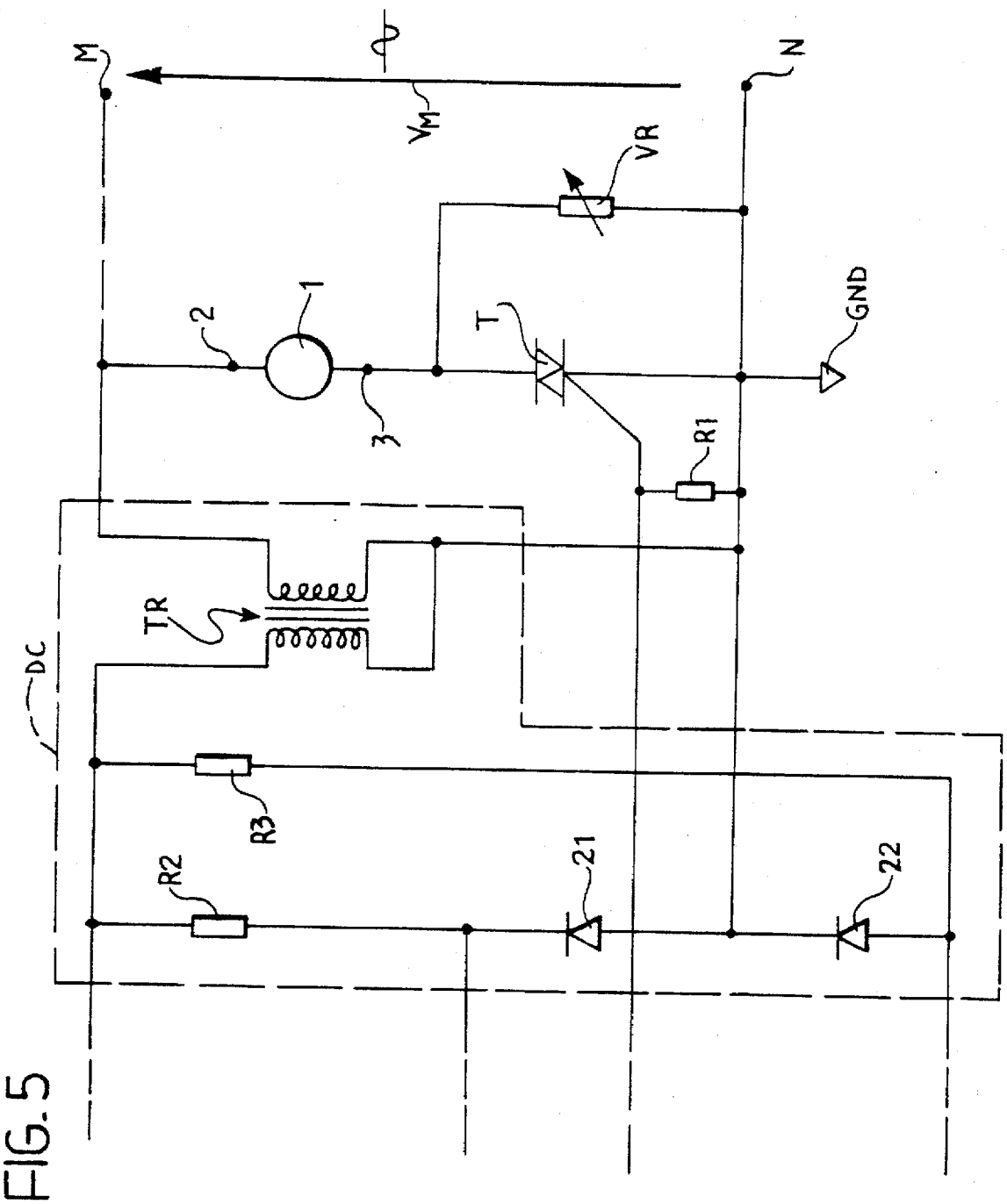
FIG. 5 is a partial diagram of a further variant of an embodiment of a control circuit according to the invention.

For the purpose of reducing the current consumption a further arrangement can consist, for example, in the structure of the diode circuit DC in the manner illustrated in FIG. 5, in which the circuit branches respectively comprising R2 and Z1, R3 and Z2, are coupled to the alternating voltage source $V_M$ by means of a transformer TR which reduces the level of the alternating voltage applied to these circuit branches. This arrangement, which can be applied to the circuit according to FIG. 2 as well as to that of FIG. 4, allows the heat dissipation to be reduced effectively but implies an increased cost, weight, and size due to the presence of the transformer TR.

Figure 6:
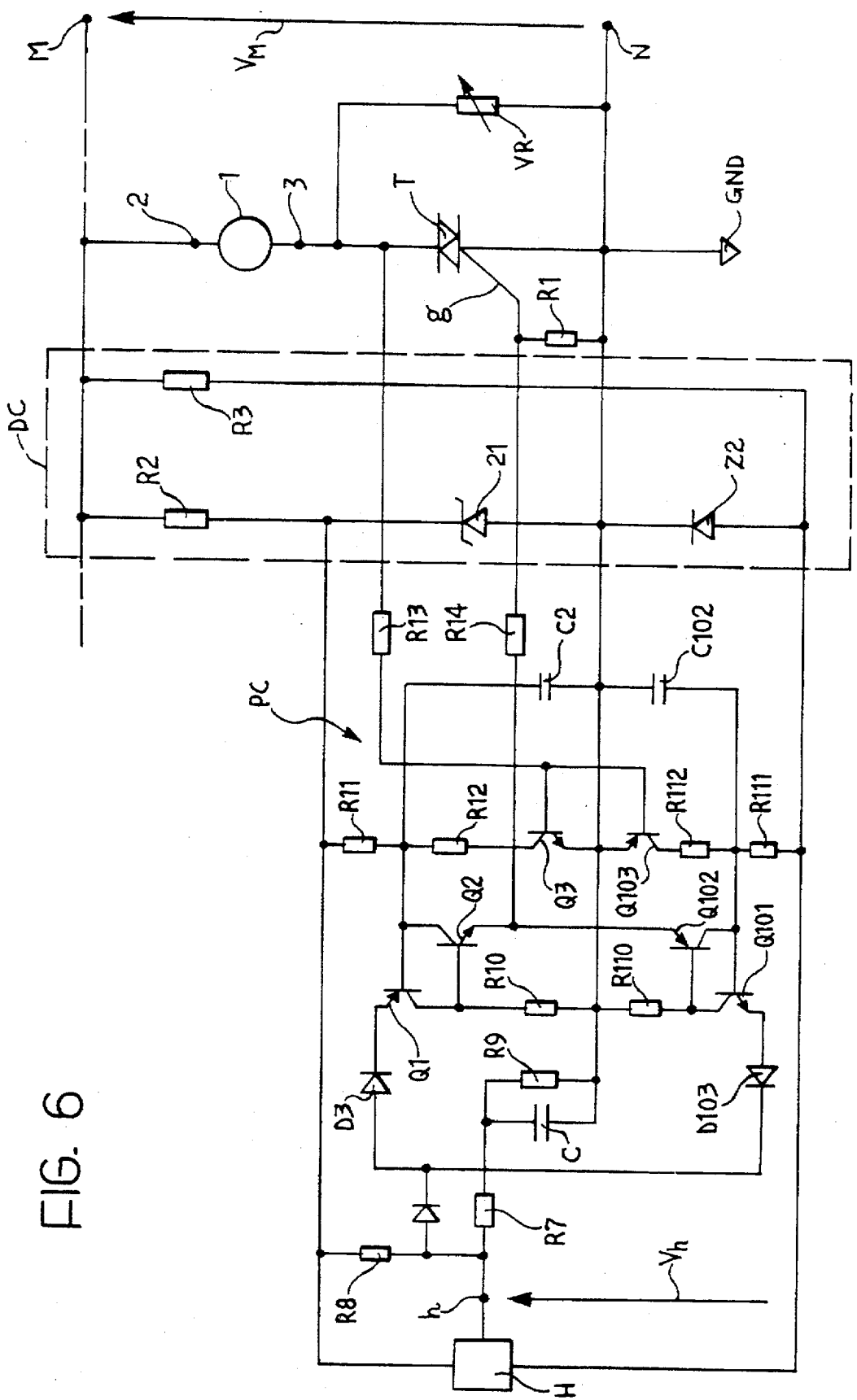
FIG. 6 is a diagram showing a further control circuit according to the invention.

A further arrangement which allows the heat dissipation in the resistors R2 and R3 to be reduced is illustrated in FIG. 6, in which parts and components already described have again been allocated the same reference symbols.

This arrangement is based on driving the gate g of the TRIAC T in a pulsed rather than a continuous mode.

To this end the driver circuit PC includes a capacitor C connected to the output h of the sensor H by a resistor R7 and to the junction between the Zener diodes Z1 and Z2. Between the output of the sensor H and the cathode of Z1 is connected a resistor R8. A resistor R9 is connected in parallel with the capacitor C, which has a resistance significantly greater than R7 and R8.

In operation, during the start-up phase of rotation of the motor, the capacitor C charges very quickly during the positive half-wave of the alternating supply voltage $V_M$ when the output of the sensor is at "high" level.

The capacitor C is connected via a diode D3 to a threshold switch formed by two transistors Q1 and Q2 respectively of pnp and npn type, connected together as shown in FIG. 6. In particular the collector of Q1 and the base of Q2 are connected to the junction between Z1 and Z2 via a resistor R10. The base of Q1 and the collector of Q2 are connected to the junction between two resistors R11 and R12 in series with the collector-emitter path of a transistor Q3 of npn type. The emitter of this transistor is connected to ground GND and its base is connected via a resistor R13 to the non-grounded terminal of the TRIAC T.

The emitter of Q2 is connected to the gate g of T via a resistor R14.

Figure 7:
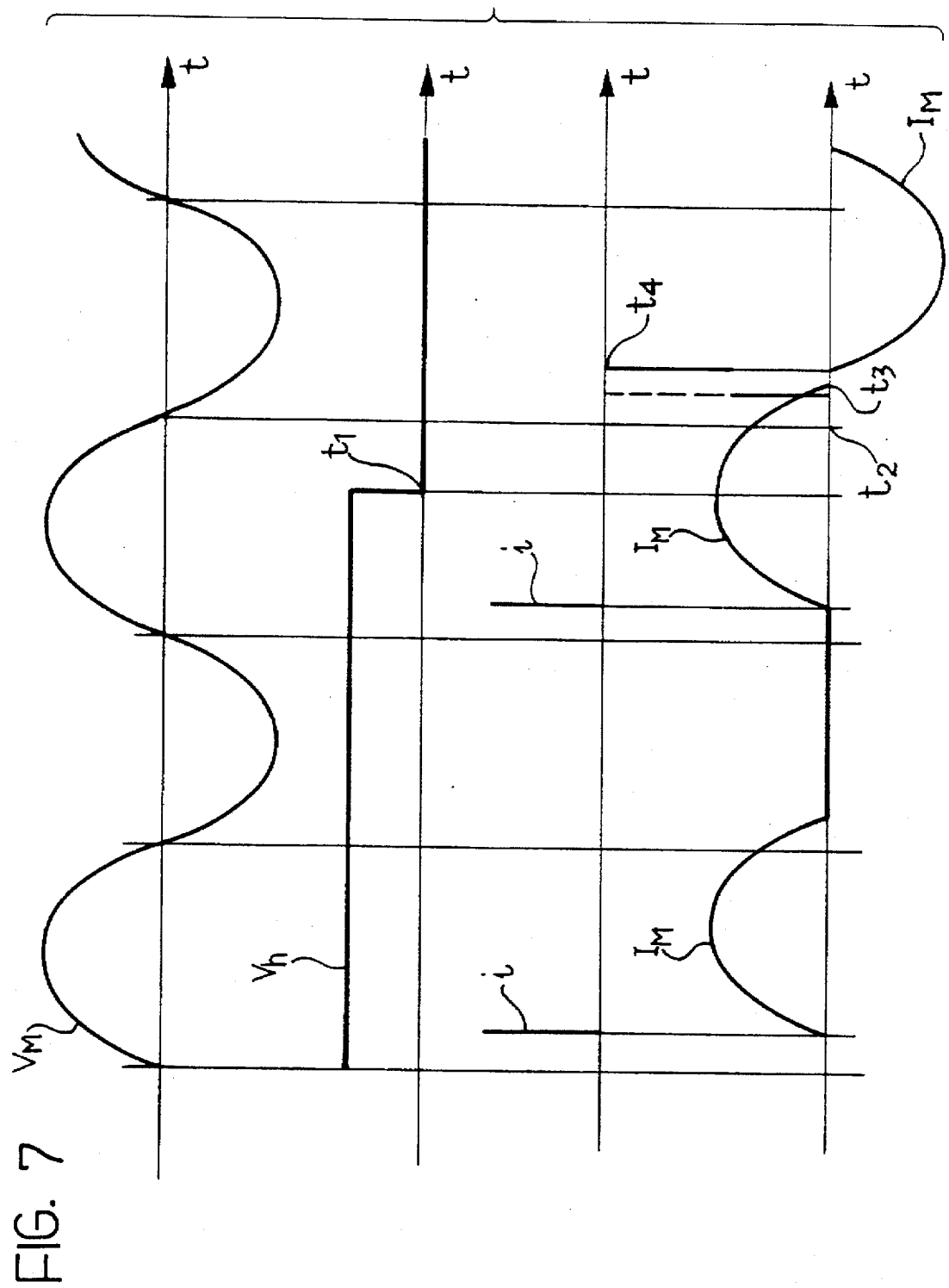
FIG. 7 is a series of graphs which show, as a function of time t plotted along the abscissa, the variation of some of the signals developed in operation of the control circuit of FIG. 6.

As previously mentioned, the capacitor C charges rapidly during the positive half-wave of the voltage $V_M$ when the signal $V_H$ is at "high" level, and then, as soon as the voltage across its terminals is such as to cause Q1 and Q2 to become conductive, this capacitor discharges to the gate g of the TRIAC T through the diode D3, the transistors Q1 and Q2, and the resistor R14. As is shown in FIG. 7, the pulse applied to the gate of the TRIAC T (indicated i) is delayed with respect to the beginning of the positive half-wave of $V_M$. This pulse causes T to become conductive so that a current $I_M$ can therefore flow through it which traverses the stator winding of the motor.

If during the subsequent negative half-wave of $V_M$ the signal $V_h$ remains at "high" level (as is shown in the second half-period of $V_M$ in FIG. 7) the conduction of current in the TRIAC T is extinguished as soon as the current $I_M$ stops. When the current in T stops the transistor Q3 which had previously been switched off, now becomes conductive. The resistors R11 and R12 now form a voltage divider to which the collector of Q2 is connected. Consequently the threshold for Q1 and Q2 to become conductive is raised. After this elevation of the threshold, during the said negative half-wave of $V_M$, whilst $V_h$ remains at "high" level, the capacitor C charges to a decidedly low voltage (about 1V or less) which is insufficient to cause Q1 and Q2 to become conductive. Therefore, during the negative half-wave of $V_M$ the capacitor C does not cause the application of any pulse to the gate g of the TRIAC T.

During the next positive half-wave of $V_M$ (as in the third half period of $V_M$ in FIG. 7) if $V_h$ is still at "high" level the capacitor C again charges in a rather rapid manner to a voltage value such as to bring Q1 and Q2 into conduction and this capacitor then discharges to gate g of T as previously described. The corresponding pulse i applied to the gate of the TRIAC T again starts the passage of the current $I_M$. The transistor Q3 remains switched off as long as the current flows in the TRIAC T. The operation of the circuit continues as described above until the polarity of the rotor R presented to the sensor H is such to cause the passage of the signal $V_h$ to "low" level as shown at instant $t_1$ in FIG. 7. This Figure refers by way of example to a situation in which the instant $t_1$ occurs during a positive half-wave of $V_M$.

After the instant $t_1$ the current $I_M$ continues to flow in the motor and in the TRIAC T even after the instant $t_2$ of commencement of the next negative half-wave of $V_M$ until this current ceases at instant $t_3$.

From the instant $t_2$ there is a negative half-wave of $V_M$ and $V_h$ is at "low" level. Consequently, starting from instant $t_2$, the capacitor C charges rapidly to a high voltage value of opposite sign from the voltage to which it charged during the positive half-waves of $V_M$.

The capacitor C is connected via a diode D103 to a further threshold switch formed by two transistors Q101 and Q102 in an arrangement which is essentially a mirror image of that of the threshold switch formed by the transistors Q1 and Q2. The base of Q102 and the collector of Q101 are connected to ground GND by a resistor R110. The base of Q101 and the collector of Q102 are connected to the junction between two resistors R111 and R112. The resistor R111 is connected to the anode of Z2. The collector-emitter path of a transistor Q103 is connected in series with R112, its emitter is connected to ground GND, and its base connected to that of the transistor Q3.

The part of the circuit described here, comprising the diode D103, the transistors Q101, Q102 and Q103 and the resistors R110, R111 and R112 is essentially a mirror image of that part of the circuit formed by the diode D3, the transistors Q1, Q2 and Q3 and the resistors R10, R11 and R12. This latter part of the circuit intervenes in the operation of the entire control circuit when the signal $V_h$ is at "high" level as described above, whilst the lower part of the circuit, which is a mirror image thereof, intervenes when the signal $V_h$ is at "low" level.

In particular, when the signal $V_h$ is at "low" level and the alternating supply voltage $V_M$ is in a negative half-wave (as in the fourth half period of $V_M$ in FIG. 7) the capacitor C charges rapidly to a high voltage of opposite sign from that to which it charged when $V_h$ was at "high" level during a positive half-wave of $V_M$. The voltage on the capacitor C increases in particular until the transistors Q101 and Q102 become conductive, thus allowing discharge of the capacitor C to the gate g of the TRIAC T which is now rendered conductive.

The pulse applied to the gate g of T has a delay with respect to the beginning of the negative half-wave of the supply voltage $V_M$, related to the charging time constant of the capacitor C.

This delay could be such that, immediately after the commutation of $V_h$ from "high" level to "low" level the first negative pulse could be applied to the gate of the TRIAC T, whilst this latter is still conductive, that is to say between the instants $t_2$ and $t_3$ of FIG. 7, as indicated by the broken line pulse in this Figure. This situation must be avoided in that the negative pulse in question would be entirely ineffective and useless, and would not then succeed in retriggering the conduction of current in the TRIAC T after the instant $t_3$ during the course of the negative half-wave of $V_M$. This situation is avoided with the circuit of FIG. 6 by the variation of the level of the voltage threshold, so that the switch Q101–Q102 becomes conductive. This threshold is in fact controlled by the transistor Q103 which is switched off when T is conductive. Therefore, with reference to FIG. 7, between the instants $t_2$ and $t_3$ the transistor Q103 is switched off and the voltage on the capacitor C does not succeed in making the transistors Q101 and Q102 conductive. After the instant $t_3$ the TRIAC no longer conducts current and the transistor Q103 becomes conductive thereby lowering the threshold associated with the transistors Q101 and Q102 to a relatively lower voltage value determined by the voltage divider formed by the resistors R111 and R112. After the instant $t_3$ the voltage on the capacitor C now succeeds in exceeding this lowered threshold making the transistors Q101 and Q102 become conductive, which in turn allows discharge of the capacitor C to the gate of the TRIAC T in an instant indicated $t_4$ in FIG. 7 at which therefore, the current through the TRIAC T starts up again.

The transistor Q103 and the associated resistors R111 and R112 on the one hand, and the transistor Q3 and the associated resistors R11 and R12 on the other, thus enable the application to the gate of the TRIAC T of the first pulse after a change of level of the signal $V_h$ only after the flow of current in the TRIAC T has ceased.

It is to be noted that with this mechanism of threshold variation described above the first pulse applied to the gate of the TRIAC T after a transition of level of the signal $V_h$ has an amplitude greater than that of the others in that the delay which is imposed on the discharge of the capacitor allows this capacitor to charge to a higher voltage level.

In the control circuit according to FIG. 6 the heat dissipation in the resistors R2 and R3 is practically limited to the charging times of the capacitor C and therefore to extremely short times.

The circuit of FIG. 6 finally includes a pair of capacitors C2, C102 disposed as mirror images for the suppression of disturbances.

Figure 8:
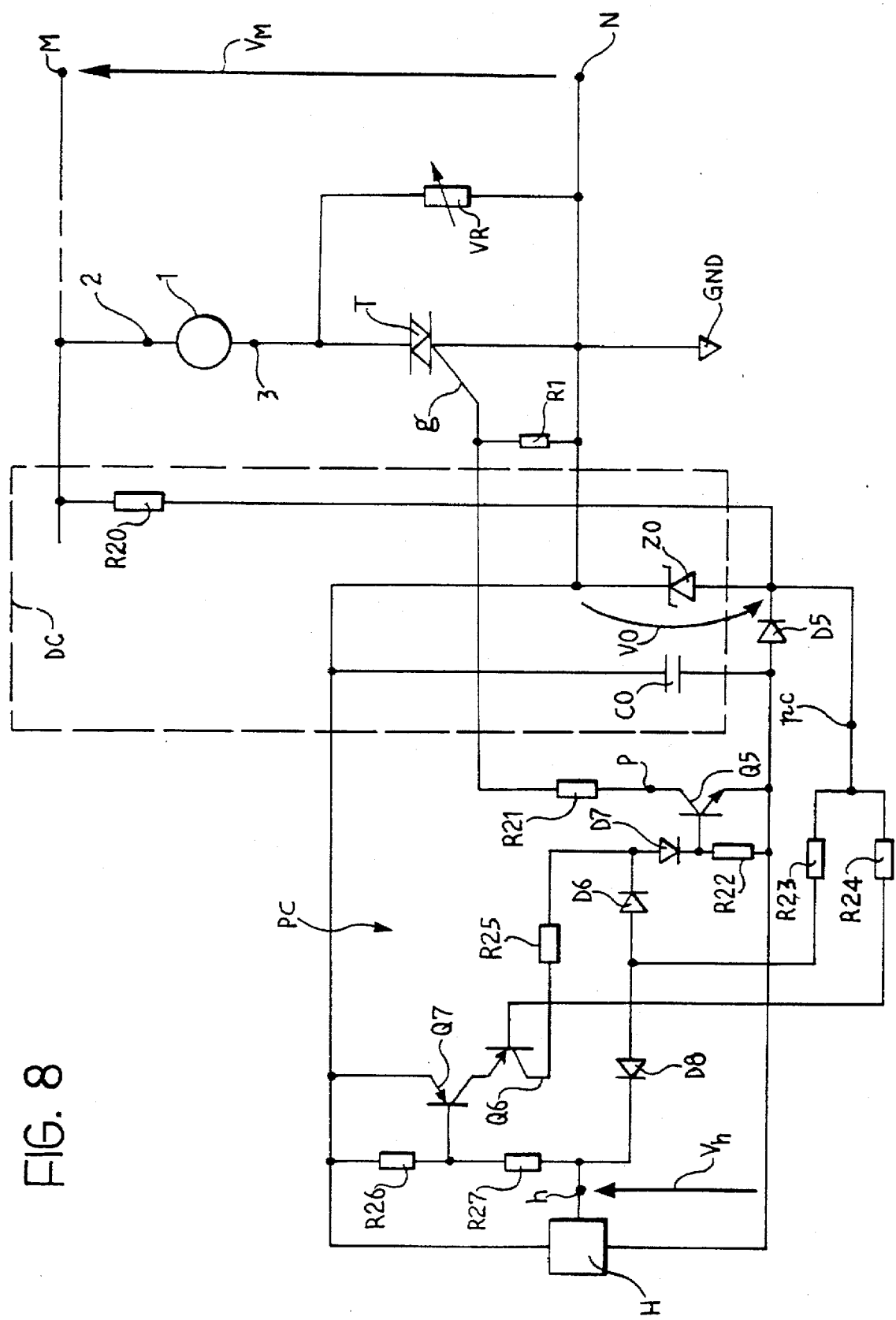
FIG. 8 is a diagram of a further control circuit according to the invention.

In FIG. 8 is illustrated a further variant embodiment of the control circuit according to the invention. In this FIG. the parts and components already described have again been allocated the same reference numerals. In the diagram of FIG. 8 the diode circuit DC comprises a single Zener diode Z0 the anode of which is connected to the terminal M via a resistor R20 and the cathode of which is connected to ground GND. The supply terminals of the sensor H are connected to the cathode of the Zener diode Z0, and to the anode of this latter via a diode D5. A capacitor C0 is connected essentially in parallel to the Zener diode Z0 to smooth the voltage which is applied between the supply terminals of the sensor H.

Figure 9:
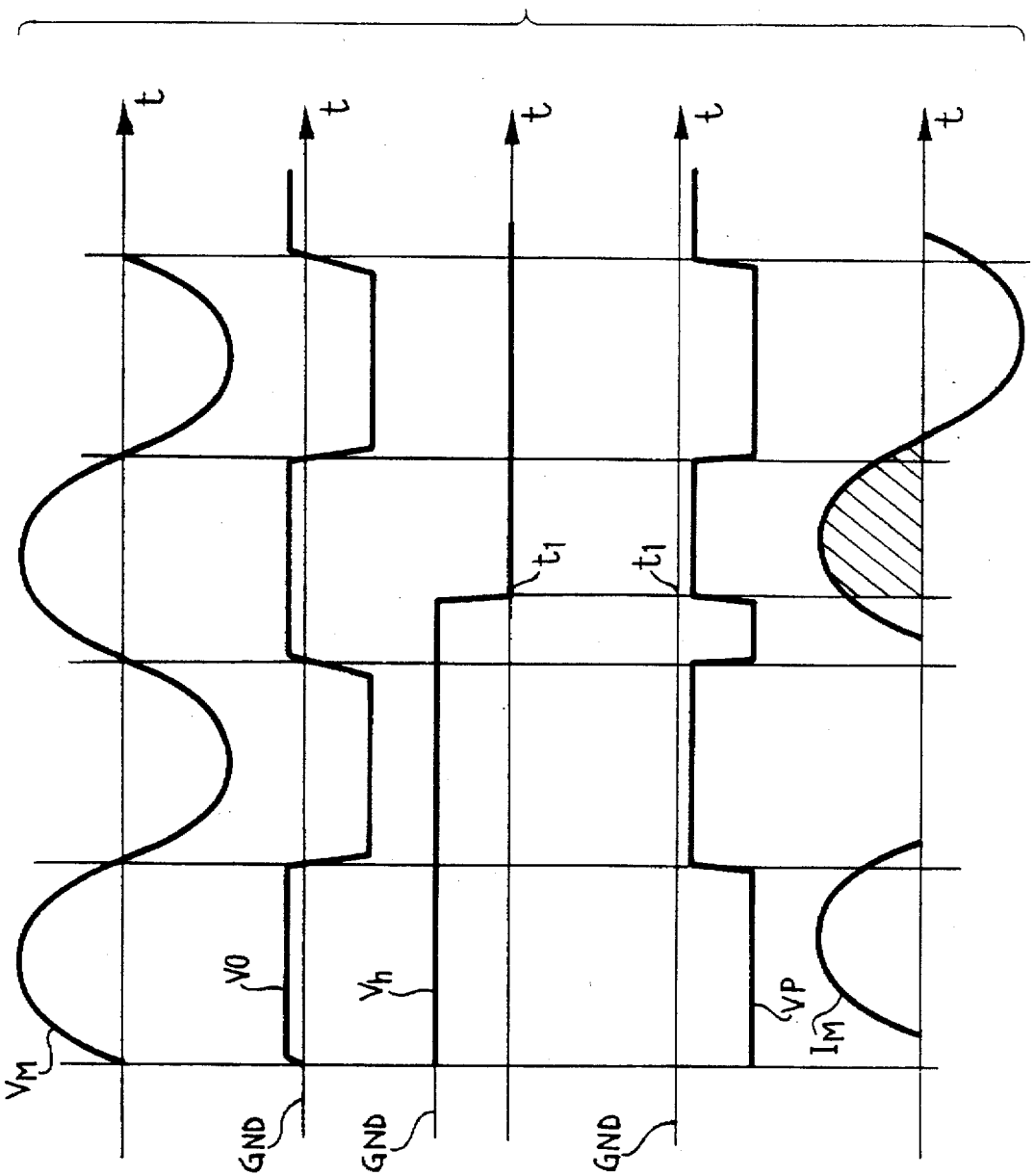
FIG. 9 is a series of graphs which show the variation, as a function of time t plotted along the abscissa, of some of the signals developed in operation of the circuit of FIG. 8.

As shown in FIG. 9, the voltage V0 which in operation appears across the terminals of the Zener diode Z0 is the same frequency as, and in phase with, the alternating supply voltage $V_M$. The voltage V0 has a non-zero mean value and supplies the sensor H, and moreover, its level is indicative of the polarity of the voltage $V_{m\,M}$.

The anode of the Zener diode Z0 is connected to the input pc of the driver circuit PC. This circuit includes a transistor Q5 of npn type the collector of which is connected to the gate g of the TRIAC T via a resistor R21, and the emitter of which is connected to the anode of the diode D5. The emitter of this transistor is also connected to the base thereof via a resistor R22.

The input pc of the driver circuit PC is connected to the base of the transistor Q5 via a resistor R23 and two diodes D6 and D7 connected as shown in FIG. 8.

A diode D8 has its anode connected to the resistor R23 and its cathode connected to the output of the sensor H.

The input pc of the driver circuit PC is connected to the base of a further transistor Q6 via a resistor R24. The transistor Q6 is of pnp type and its collector is connected to the anode of D7 via a resistor R25 and its emitter connected to the collector of a transistor Q7 also of pnp type. The emitter of this latter transistor is connected to the cathode of the Zener diode Z0 and its base is connected to the junction of two resistors R26 and R27 connected as a voltage divider between the cathode of the Zener diode Z0 and the output h of the sensor H.

The circuit of the diagram of FIG. 8 functions in the following manner.

It is supposed that the first half-wave of the alternating supply voltage $V_M$ is positive and the signal $V_h$ at the output of the sensor H is at "high" level as shown in the graphs of FIG. 9. In these conditions the voltage V0 on the Zener diode Z0 relative to ground GND, is equal to the small voltage across this diode which is forward biased. The transistors Q6 and Q7 are turned off in that the output of the sensor H is at "high" level. The transistor Q5 is, on the other hand, controlled to conduct by the effect of the current which arrives at its base via R23, D6 and D7. The collector P of this transistor is therefore at a potential substantially corresponding to that of its emitter thereby causing the triggering of the TRIAC T. The voltage between the collector P of Q5 and ground GND is indicated by the waveform $V_P$ in FIG. 9. Following triggering of the TRIAC T a current $I_M$ flows in the motor which laps in phase the positive half-wave of $V_M$ as shown in FIG. 9.

At the first negative half-wave of $V_M$ the voltage V0 on the Zener diode Z0 becomes negative and substantially equal to the Zener voltage of this diode. The current $I_M$ continues to flow in the motor until it falls to zero, after which it is extinguished in that the TRIAC is switched off. If, as shown in the exemplary graphs of FIG. 9, the voltage $V_h$ at the output of the sensor H remains at "high" level the transistors Q6 and Q7 remain switched off. The transistor Q5 is also switched off and the TRIAC T is not brought into conduction during the negative half-wave of $V_M$.

Operation continues in the manner described above until, after the progressive rotation of the rotor of the motor, the signal $V_h$ at the output of the sensor H passes to the "low" level as is shown at instant $t_1$ in FIG. 9. In this Figure it is supposed that the instant occurs during a positive half-wave of the alternating voltage $V_M$.

The transition to "low" level of $V_h$ has the effect of biasing the transistor Q7. The transistor Q6 becomes conductive as soon as the subsequent negative half-wave of $V_M$ starts, and a current arrives at the base of Q5 via the transistors Q7 and Q6, the resistor R25 and the diode D7. The transistor Q5 is maintained conductive for the whole of the negative half-wave of $V_M$ so that the current $I_M$ continues to flow in the TRIAC and in the motor even after it passes through zero, becoming negative, as shown in the lower graph of FIG. 9. In this Figure the hatched area in the graph of the current $I_M$ corresponds to the time period during which the current $I_M$ causes the application of a resisting torque to the rotor.

Subsequently, as long as $V_h$ remains at "low" level, negative half-waves of current flow in the motor, phase delayed with respect to the negative half-waves of $V_M$. When the signal $V_h$ returns to "high" level a positive half-wave of current flows in the motor, phase delayed with respect to the positive half-wave of $V_M$.

The operation then continues as described above until, due to the effect of the acceleration, the rotor of the motor becomes synchronised with the frequency of the mains voltage $V_M$.

In conditions of synchronism the signal $V_h$ is at exactly the same frequency as, and in phase with, the current flowing in the motor.

Figure 10:
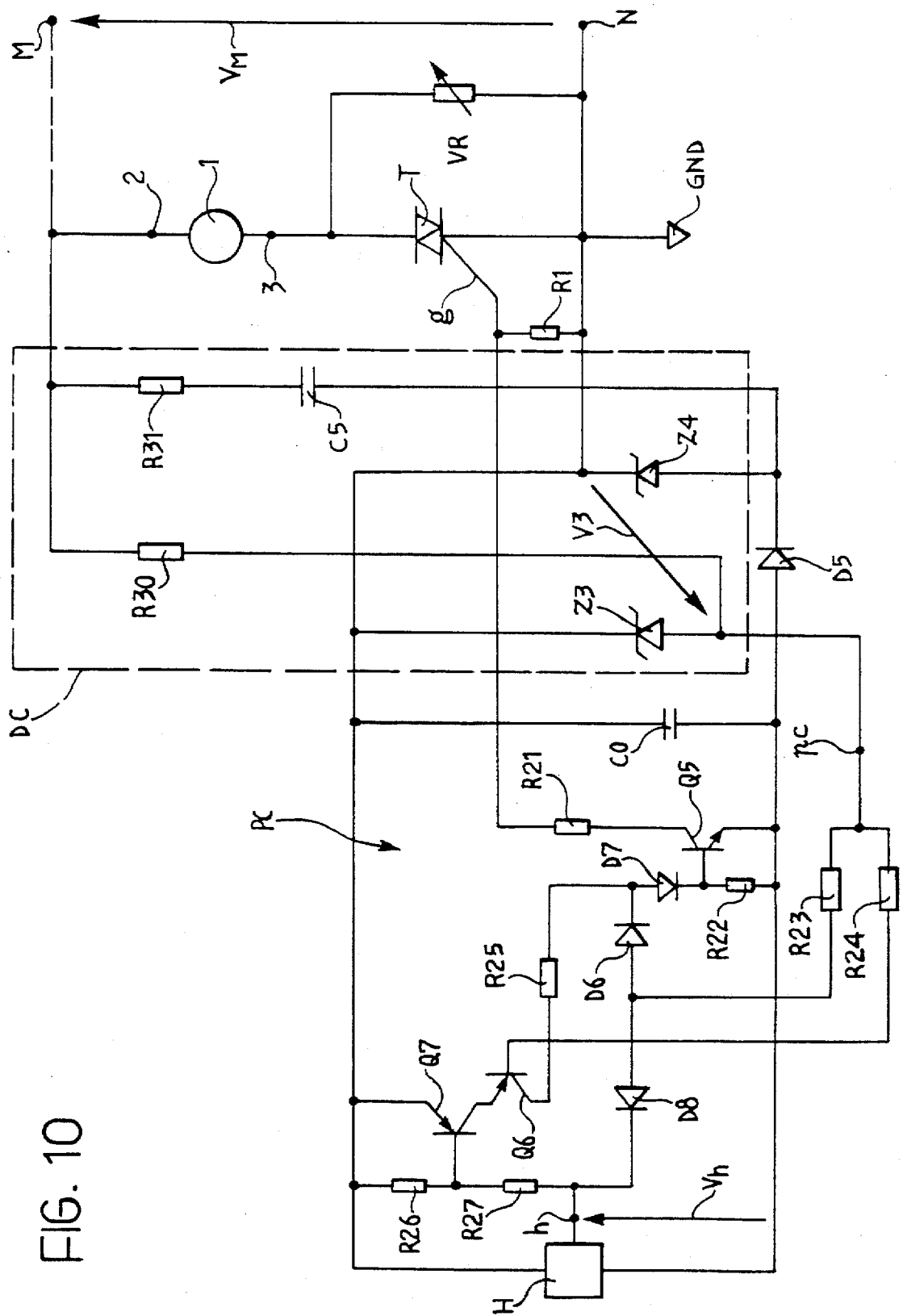
FIG. 10 is a diagram showing a further control circuit according to the invention.

In the variant embodiment shown in FIG. 10, the diode circuit DC includes two Zener diodes Z3 and Z4. The anode of the diode Z3 is connected to the input pc of the driver circuit PC, which has a structure corresponding to that described above with reference to FIG. 8. The anode of Z3 is also connected to the terminal M via a resistor R30.

The cathode of the Zener diode Z4 is connected to ground GND and the anode is connected to the terminal M via a capacitor C5 and a resistor R31 connected together in series. The anode of Z4 is also connected to the cathode of the diode D5.

In the circuit according to FIG. 10 the supply to the sensor H is ensured by the resistor R31, the capacitor C5 and the Zener diode Z4. The resistor R31 in particular protects the Zener diode Z4 (and the diode D5) from current peaks. The voltage on the Zener diode Z4, smoothed by the capacitor C0 therefore assures supply to the sensor H. It will be seen, however, that due to the presence of the capacitor C5 the potential of the anode of Z4 with respect to ground GND is phase displaced in advance of the alternating supply voltage $V_M$.

However, the potential of the anode of the Zener diode Z3 with respect to ground GND is, on the other hand, exactly in phase with the voltage $V_M$ and can therefore control the input pc of the control circuit PC by providing this input with a signal at the same frequency as, and in phase with, $V_M$ and indicative of the polarity of $V_M$. This signal has been indicated V3 in FIGS. 10 and 11.

Apart from the structural differences discussed above the circuit of FIG. 10 corresponds substantially to that of FIG. 8 and its operation is entirely similar to that of this circuit.

Figure 11:
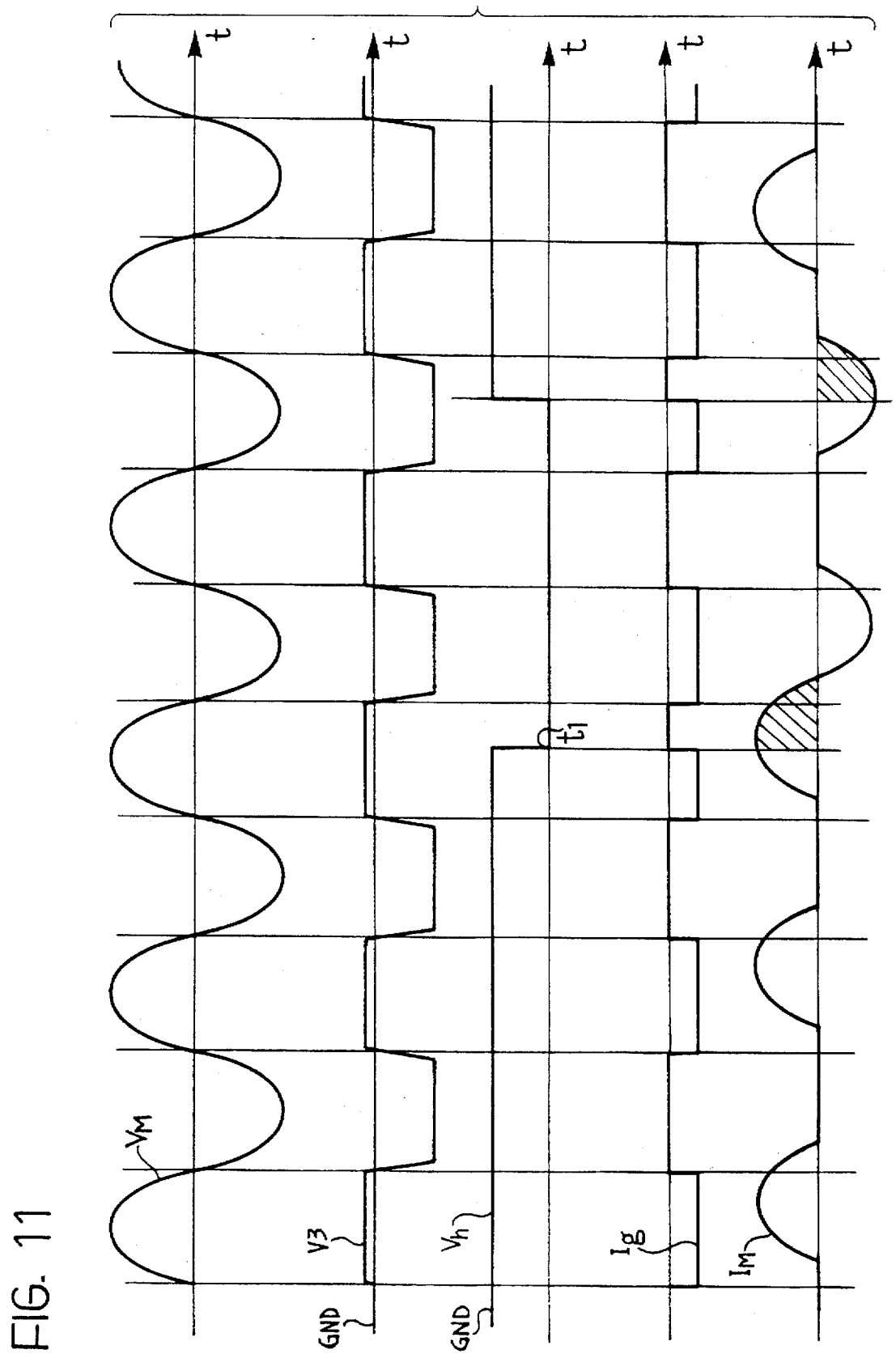
FIG. 11 is a series of graphs which show, as a function of time plotted along the abscissa, the variation of some of the signals developed in operation of the circuit shown in FIG. 10.

In FIG. 11 there have been plotted exemplary variations of $V_M$, V3 and $V_h$ of the gate current $I_g$ of the TRIAC T, and the current $I_M$ which flows in the motor and in the TRIAC in operation of the circuit of FIG. 10. These graphs are self explanatory and therefore further comment is not necessary.

The circuit according to FIG. 10 has the advantage over that of FIG. 8 of a smaller dissipation of heat. It will be seen that the resistor R31 intended to protect the Zener diode Z4 from current peaks could be constituted also by a PCT resistor.

Naturally, the principle of the invention remaining the same, the embodiments and details of construction can be widely varied with respect to what has been described and illustrated purely by way of non-limitative example, without by this departing from the ambit of the present invention.

What is claimed is:

1. A control circuit for a brushless synchronous electric motor including a permanent magnet rotor (R) rotatable between stator pole pieces (5, 6) shaped in such a way to define, with respect to the rotor (R), an air gap (7) of non-uniform width such that the rotor (R) at rest is disposed in a predetermined angular position (α) and upon start-up has a preferential direction of rotation;

the control circuit being characterised in that it comprises, in combination a bi-directional static switch (T) in series with the stator winding (1) between the terminals (M, N) of an alternating voltage source ($V_M$);

signal generator circuit means (Z1, Z2; Z0; Z3) operable to provide a signal indicative of the polarity of the alternating voltage source ($V_M$);

a fixed electric sensor (H) associated with the rotor (R) to provide a signal ($V_h$) indicative of the polarity of the part of the rotor (R) facing it; and a driver circuit (PC) connected to the sensor (H) and to the signal generator circuit means (Z1, Z2; Z0; Z3) and arranged to provide a control signal for controlling the conduction at a control terminal (g) of the switch (T) in a predetermined manner in dependence on the position of the rotor (R) and the polarity of the alternating voltage source ($V_M$).

2. A control circuit according to claim 1, characterised in that the signal generator circuit means are constituted by a single diode circuit (DC) coupled to the alternating voltage source ($V_M$), including at least one Zener diode (Z1, Z2; Z0; Z3, Z4) and operable to provide a voltage ($V_H$; V0) for supply of the sensor (H), and a voltage signal (V1, V2; V0; V3) in phase with the voltage of the alternating voltage source ($V_M$) and indicative of its polarity.

3. A control circuit according to claim 2, characterised in that the diode circuit (DC) comprises:

a first Zener diode (Z1) the cathode of which is coupled via a first resistor (R2) to a first terminal (M) of the alternating voltage source ($V_m$) to which the motor (1) is connected, and the anode of which is connected to the second terminal (N) of the voltage source to which the bi-directional switch (T) is connected; and a second Zener diode (Z2) the cathode of which is connected to the anode of the first Zener diode (Z1) and the anode of which is coupled to the first terminal (M) of the alternating voltage source ($V_M$) via a second resistor (R3);

the supply terminals of the sensor (H) being connected to the cathode of the first Zener diode (Z1) and to the anode of the second Zener diode (Z2).

4. A control circuit according to claim 3, characterised in that the first and second resistors (R2, R3) are coupled to the alternating voltage source ($V_M$) via a voltage-reducing transformer (TR).

5. A control circuit according to claim 3 or claim 4, characterised in that the sensor is a Hall-effect sensor (H) and the driver circuit (PC) includes a pair of diodes (D1, D2) connected in anti-parallel between the output of the sensor (h) and the control terminal (g) of the bi-directional switch (T); the output (h) of the sensor (H) being further connected to the cathode of the first Zener diode (Z1).

6. A control circuit according to claim 3 or claim 4, characterised in that the sensor is a Hall-effect sensor (H) and the driver circuit (PC) includes a transistor (Q0) the base of which is connected to the output (h) of the sensor (H) and the collector-emitter path of which is connected between the cathode of the first Zener diode (Z1) and the control terminal (g) of the bi-directional switch (T), and a diode (D2) the anode and cathode of which are connected between the emitter and base of the transistor (Q0) in anti-parallel with respect to the base-emitter junction of the transistor (Q0).

7. A control circuit according to claim 6, characterised in that a third resistor ($R'_4$) is interposed between the base and the collector of the transistor (Q0).

8. A control circuit according to claim 3 or claim 4, characterised in that the sensor is a Hall-effect sensor (H) and the driver circuit (PC) includes pulse generator means (C; Q1–Q3, Q101–Q103; R11, R12; R111, R112; R14) the input of which is connected to the output (h) of the sensor (H) and the output of which is connected to the control terminal (g) of the bi-directional switch (T); the pulse generator means being arranged to emit a positive pulse at each positive half-wave of the voltage ($V_M$) across the first and second terminals (M, N) of the alternating voltage source ($V_M$) when the output of the sensor (h) is at a high level, and a negative pulse at each negative half-wave of the voltage ($V_M$) across the first and second terminals (M, N) when the output of the sensor (H) is at low level.

9. A control circuit according to claim 8, characterised in that the pulse generator means (C, Q1–Q3, Q101–Q103, R11, R12; R111, R112, R14) are arranged to generate the positive and negative pulses respectively with a predetermined delay with respect to the beginning of each positive half-wave and negative half-wave respectively of the alternating voltage ($V_M$) of the voltage source.

10. A control circuit according to claim 8, characterised in that the pulse generator means comprises:

a capacitor (C) connected between the output (h) of the sensor (H) and the junction (GND) of the first and second Zener diode (Z1, Z2); and a first and second threshold switch circuit (Q1–Q3; R11, R12; Q101–Q103; R111, R112) connected between the capacitor (C) and the control terminal (g) of the bi-directional switch (T).

11. A control circuit according to claim 8, characterised in that the pulse generator means (C; Q1–Q3, R11, R12; Q101–Q103, R111, R112) include enablement circuit means (Q3; Q103) connected to the bi-directional switch (T) and arranged to enable the emission of the first pulse after a change of level of the output (h) of the sensor (H) only after the current in the bi-directional switch (T) has ceased.

12. A control circuit according to claim 11, characterised in that the enablement circuit means (Q3; Q103) are connected to the threshold switch circuits (Q1, Q2; Q101, Q102) and are arranged to cause an increase in the threshold of the switch circuits (Q1, Q2; Q101, Q102) when there is current in the bi-directional switch (T).

13. A control circuit according to claim 2, characterised in that the diode circuit (DC) includes a first Zener diode (Z0; Z3) the anode of which is coupled via a first resistor (R20; R30) to a first terminal (M) of the alternating voltage source ($V_M$) to which the motor (1) is connected, and the cathode of which is connected to the second terminal (N) of the voltage source to which the bi-directional switch (T) is connected; the anode of the first Zener diode (Z0; Z3) being connected to the input of the driver circuit (PC) to supply it in operation with a signal indicative of the polarity of the alternating voltage ($V_M$).

14. A control circuit according to claim 13, characterised in that the diode circuit (DC) includes a single Zener diode (Z0).

15. A control circuit according to claim 13, characterised in that the diode circuit (DC) includes a second Zener diode (Z4) the anode of which is coupled via a second resistor (R31) to the first terminal (M) of the alternating voltage source ($V_M$) and the cathode of which is connected to that of the first Zener diode (Z3); the terminals of the sensor (H) being connected to the cathode and anode respectively of the second Zener diode (Z4).

16. A control circuit according to any one of claims 13 to 15, characterised in that the driver circuit (PC) includes a first transistor (Q5) the base of which is connected to the anode of the first Zener diode (Z0; Z3) and the collector-emitter path of which is connected between the control terminal (g) of the bi-directional switch (T) and the anode of the first Zener diode (Z0; Z3), and a commutation circuit includes second and third transistors (Q7, Q6) the bases of which are connected to the output of the sensor (H) and the anode of the first Zener diode (Z0; Z3) respectively and the collector-emitter paths of which are connected in cascade between the cathode of the first Zener diode (Z0; Z3) and the base of the first transistor (Q5).

* * * * *